United States Patent

Bradshaw et al.

[11] Patent Number: 6,112,211
[45] Date of Patent: Aug. 29, 2000

[54] RECONFIGURATION AN AGGREGATE FILE INCLUDING DELETE-FILE SPACE FOR OPTIMAL COMPRESSION

[75] Inventors: Paul Lawrence Bradshaw, Santa Cruz, Calif.; David Maxwell Cannon, Tucson, Ariz.; Wayne Curtis Hineman, San Jose, Calif.; Michael Allen Kaczmarski, Tucson, Ariz.; Robert Michael Rees, Los Gatos, Calif.

[73] Assignee: International Business Machines Corporation, Armonk, N.Y.

[21] Appl. No.: 08/977,549

[22] Filed: Nov. 25, 1997

[51] Int. Cl.$^7$ .................................................. G06F 17/30
[52] U.S. Cl. .......................... 707/205; 707/101; 711/171
[58] Field of Search ................................. 707/200–205, 707/100–101; 711/4, 111, 171, 172, 133, 112, 203

[56] References Cited

U.S. PATENT DOCUMENTS

| | | | |
|---|---|---|---|
| 5,261,088 | 11/1993 | Baird et al. | 395/600 |
| 5,463,772 | 10/1995 | Thompson et al. | 707/101 |
| 5,481,702 | 1/1996 | Takahashi | 707/205 |
| 5,568,635 | 10/1996 | Yamguchi | 711/171 |
| 5,590,320 | 12/1996 | Maxey | 395/619 |
| 5,675,789 | 10/1997 | Ishii et al. | 707/204 |
| 5,710,909 | 1/1998 | Brown et al. | 711/170 |
| 5,778,411 | 7/1998 | DeMoss et al. | 711/4 |
| 5,893,920 | 4/1999 | Shaheen et al. | 711/133 |
| 5,915,129 | 6/1999 | Slivka et al. | 710/68 |
| 5,930,828 | 7/1999 | Jensen et al. | 711/170 |

OTHER PUBLICATIONS

"An Evaluation of the Lenpel–Ziv–Welch Data Compression Algorithm," Kotze et al., COMSIG 1989, pp. 65–69, IEEE, Jun. 1989.

"An Improvement to Ziegler's Sparse Matrix Compression Algorithm," Chnag et al., Journal of Systems and Software, vol. 35, Issue 1, pp. 67–71, Oct. 1996.

*Primary Examiner*—Hosain T. Alam
*Attorney, Agent, or Firm*—Gray Cary Ware Freidenrich

[57] ABSTRACT

Digital data objects containing unused space are reconfigured to facilitate more efficient compression of the data objects. First, a determination is made whether the data object contains regions of unused storage space. Such space may represent deleted files, corrupted data, expired data, etc. If regions of unused storage space exist, they are replaced with a predetermined bit pattern. This bit pattern is specifically chosen so that, if provided as input to a predetermined digital data compression process, it would be compressed with a predetermined predicted compression efficiency. For example, the bit pattern may comprise a repeating sequence of binary zeros, which is optimally compressed by most known compression processes. After reconfiguration of the data object, the data object may be provided as input to the compression process and compressed.

37 Claims, 4 Drawing Sheets

RECONFIGURATION AN AGGREGATE FILE INCLUDING DELETE-FILE SPACE FOR OPTIMAL COMPRESSION

BACKGROUND OF THE INVENTION

1. Field of the Invention

The present invention relates to the storage of digital data objects. More particularly, the invention concerns the reconfiguration of data objects containing unused space to facilitate more efficient compression of the data objects.

2. Description of the Related Art

The electronic exchange of data is central in this information era. Scientists and engineers have provided the necessary infrastructure for widespread public availability of an incredible volume of information. The internet is one chief example. In addition, the high-technology industry is continually achieving faster and more diverse methods for transmitting and receiving data. Some examples include satellite communications and the ever-increasing baud rates of commercially available computer modems.

Along with this explosive exchange of information, it is increasingly important for users to have a similarly advanced means for storing their data. Thus, the development of electronic data storage systems is now more important than ever. And, engineers have squarely met the persistent challenge of customer demand by providing speedier and more reliable storage systems.

As an example, engineers at INTERNATIONAL BUSINESS MACHINES® (IBM®) have developed various flexible systems called "storage management servers" designed to store and manage data for remotely located clients. One particular system is called the ADSTAR™ Distributed Storage Manager (ADSM™) product. With the ADSM product, a central server is coupled to multiple client platforms and one or more administrators. The server provides storage, backup, retrieval, and other management functions for the server's clients.

Although the ADSM product includes some significant advances and also enjoys significant commercial success today, IBM has continually sought to improve the performance and efficiency of this and other data storage systems. One area of particular focus is the efficient use of data storage spaces which is important for a number of reasons. Concerned with cost-effectiveness, customers prefer to purchase as little storage as possible to fulfill their needs. Customers also wish to avoid running out of space. Additionally, in the case of removable media such a tape, customers strive to avoid inefficient data storage because it is more expensive to access broadly distributed or "spread out" data, due to greater input/output ("I/O") demands. A robotic transport mechanism, for example, may have to load and unload tapes more often because otherwise compact data is scattered over many different tapes.

Although some useful solutions have been proposed for these problems, IBM is nevertheless seeking better ways of addressing these problems to further improve the performance and the efficiency of its products to benefit its customers.

SUMMARY OF THE INVENTION

Broadly, the present invention involves reconfiguring a data object containing unused storage space to facilitate more efficient compression of the data object. First, a determination is made whether the data object contains any regions of unused storage space. Such space may represent deleted files, corrupted data, expired data, etc. If one or more regions of unused storage space exist, they are replaced with a predetermined bit pattern. This bit pattern is specifically chosen so that, if provided as input to a predetermined digital data compression process, it would be compressed with a predetermined predicted compression efficiency. For example, the bit pattern may comprise a repeating sequence of binary zeros, optimally compressed by most known compression processes. After reconfiguration of the data object, the data object may be provided as input to the compression process and compressed.

Accordingly, one embodiment of the invention involves a method to reconfigure a data object containing regions of unused storage space, to facilitate more efficient compression of the data object. In another embodiment, the invention may be implemented to provide an apparatus, such as a data storage subsystem, programmed to reconfigure a data object containing regions of unused storage space to facilitate more efficient compression of the data object. In still another embodiment, the invention may be implemented to provide a signal-bearing medium tangibly embodying a program of machine-readable instructions executable by a digital data processing apparatus to perform method steps to reconfigure a data object containing regions of unused storage space, to facilitate more efficient compression of the data object.

The invention affords its users with a number of distinct advantages. Chiefly, the invention saves storage space by reconfiguring data objects for especially efficient compressed storage. Also, the invention is compatible with many existing hardware and software environments, since the predetermined bit pattern may be chosen for recognition by many known compression processes.

The invention is especially beneficial in a storage environment that uses aggregate files each comprising a contiguous aggregation of multiple constituent user files. In this environment, deleted-file space may arise in an aggregate file when one or more constituent user files are deleted. Instead of rewriting the aggregate file without the deleted-file space, the invention stores the predetermined binary bit pattern in these spaces, to ensure maximum storage compression of these regions. This avoids any possible difficulties caused by rewriting the aggregate file without its deleted-file space and leaving an inconsistent backup counterpart elsewhere in the system. This also saves overhead costs, since there is no change in the constituent user files' relative positions that must be considered when accessing the managed file in the future.

The invention also provides a number of other advantages and benefits, which should be apparent from the following description of the invention.

DETAILED DESCRIPTION OF THE PREFERRED EMBODIMENTS

The nature, objects, and advantages of the invention will become more apparent to those skilled in the art after considering the following detailed description in connection with the accompanying drawings. As mentioned above, the invention concerns reconfiguration of data objects containing unused space, to facilitate more efficient compression of the data objects. An illustrative use of the invention is to reconfigure "aggregate" files, each comprising an aggregation of one or multiple individual "user" files.

Hardware Components & Interconnections
General Description of Data Storage System Introduction One aspect of the invention concerns a storage management system, which may be embodied by various hardware components and interconnections. One example is shown by the storage management system 100 of FIG. 1. Broadly, the system 1100 includes a data storage subsystem 102, one or more administrator stations 104, and one or more client stations 106. The subsystem 102 operates in response to directions of the client stations 106, as well as the administrator stations 104.

Figure 1:
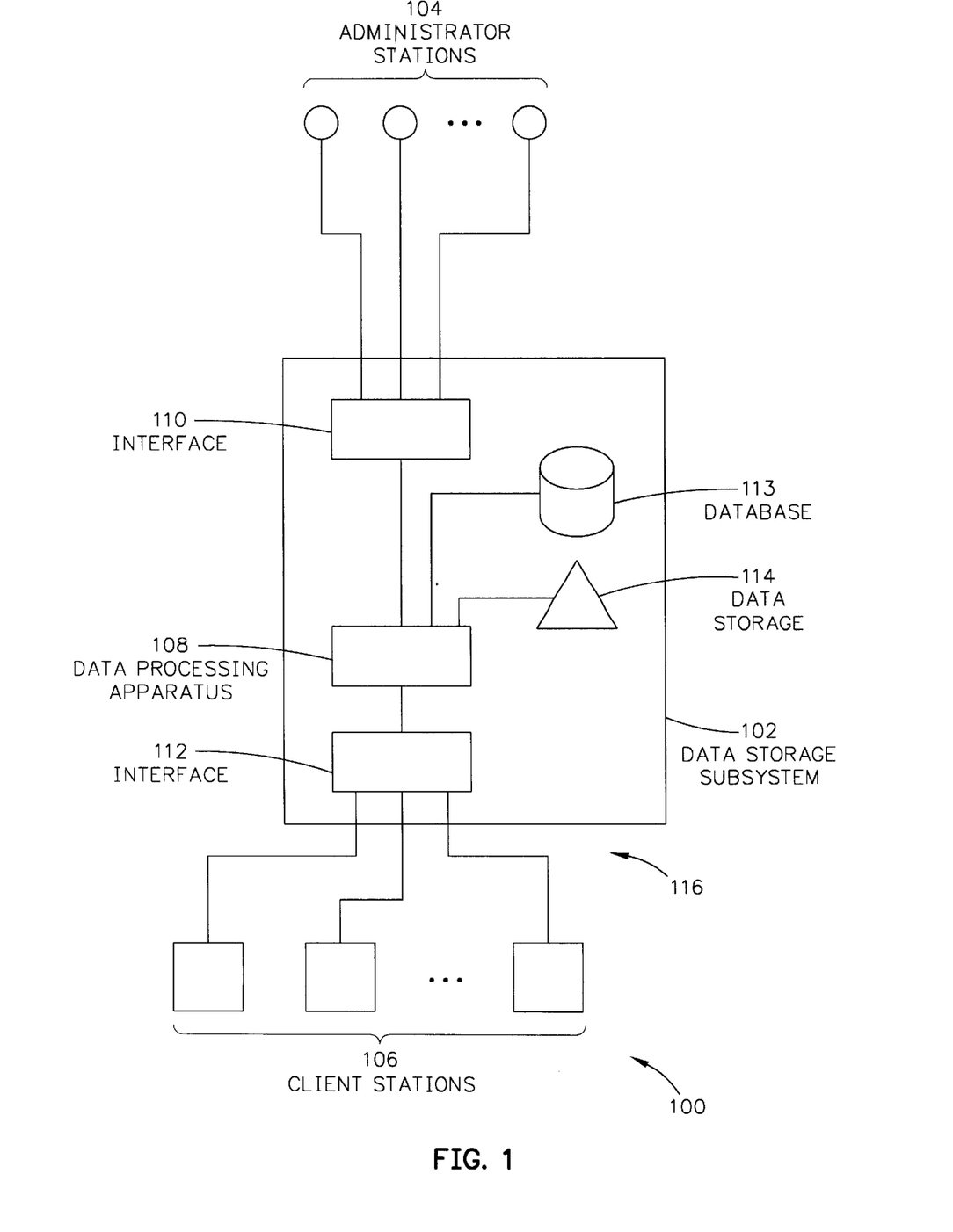
FIG. 1 is a block diagram of the hardware components and interconnections of a storage management system in accordance with the invention.

The administrator stations 104 are used by system administrators to configure. monitor, and repair the subsystem 102. Under direction of an end user, the client stations 106 use the subsystem 102 to store and manage data on their behalf. In a particular embodiment of the invention, each client station 106 may create and regard data in the form of "user tiles". In this embodiment, each client station 106 separately employs the subsystem 102 to archive, backup, retrieve, and restore its user files. Accordingly, each user file is associated with a single client station 106, which is the source of that user file.

Client Stations

Each client station 106 may comprise any general purpose computer, such as an RS-6000 based workstation. PENTIUM processor based personal computer, mainframe computer, etc. The client stations 106 may comprise similar or different machines, running the similar or different operating systems. Some exemplary operating systems include VMS, MVS, UNIX, OS/2, WINDOWS-NT, OS-400, DOS. etc.

The client stations 106 are interconnected to the subsystem 102 by a network 116. The network 116 may comprise any desired connection, including one or more conductive wires or busses, fiber optic lines, data communication channels, wireless links, internet connections, telephone lines, shared memory, etc. Preferably, a high speed communication channel such as a T3 link is used, employing a network protocol such as APPC or TCP/IP.

Administrator Stations

The administrator stations 104 comprise electronic equipment for a human or automated storage administrator to convey machine-readable instructions to the subsystem 102. Thus, the stations 104 may comprise processor-equipped general purpose computers or "dumb" terminals, depending upon the specific application.

Data Storage Subsystem: Subcomponents

In an exemplary embodiment, the data storage subsystem 102 may comprise a commercially available server such as an IBM brand ADSM product. However, since other hardware arrangements may be used as well, a generalized view of the subsystem 102 is discussed below.

The data storage subsystem 102 includes a data processing apparatus 108, having a construction as discussed in greater detail below. The data processing apparatus 108 exchanges signals with the network 116 and the client stations 106 via an interface 112, and likewise exchanges signals with the administrator stations 104 via an interface 110. The interfaces 110/112 may comprise any suitable device for communicating with the implemented embodiment of client station and administrator station. For example, the interfaces 110/112 may comprise ETHERNET cards, small computer system interfaces ("SCSIs"), parallel data ports, serial data ports, telephone modems, fiber optic links, wireless links, etc.

The data processing apparatus 108 is also coupled to a database 113 and a data storage 114. The database 13 and data storage 114 may comprise the same or different storage areas. The database 113 and storage 114 are implemented with one or more digital data storage devices, or portions thereof, such as magnetic hard disk drives, writable optical disks, optical disks, or other direct access storage devices ("DASDs"), magnetic tape or other sequential access storage media. Furthermore, these devices may be co-located with the subsystem 102, or remotely located, depending upon the user's requirements. Storage devices of the database 113 and data storage 114 may be coupled to the data processing apparatus 108 by a variety of means, such as one or more conductive wires or busses, fiber optic lines, data communication channels, wireless links, internet connections, telephone lines, SCSI connection, ESCON connect, etc.

Exemplary Data Processing Apparatus

Figure 2:
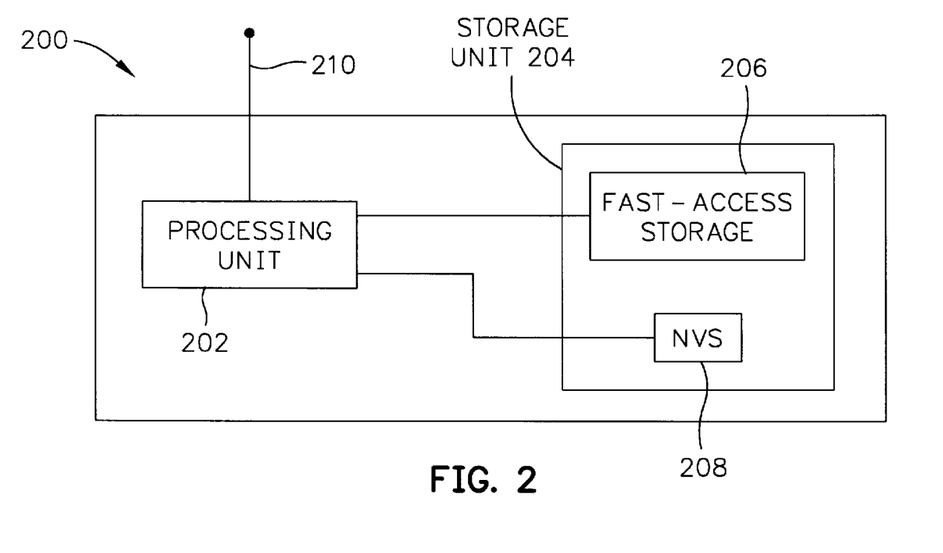
FIG. 2 is a block diagram of a digital data processing machine in accordance with the invention.

The data processing apparatus 108 may be embodied by various hardware components and interconnections. FIG. 2 shows one example in the form of a digital data processing apparatus 200.

The apparatus 200 includes a processing unit 202, such as a microprocessor or other processing machine, coupled to a storage unit 204. In the present example, the storage unit 204 includes a fast-access storage 206 as well as nonvolatile storage 208. The fast-access storage 206 preferably comprises random access memory, and may be used to store programming instructions executed by the processing unit 202. The nonvolatile storage 208 may comprise, for example, one or more magnetic data storage disks such as a "hard drive", a tape drive, or any other suitable storage device. The apparatus 200 also includes at least one input/output 210, such as a line, bus, cable, electromagnetic link, or other means for exchanging data between the processing unit 202 and other components of the subsystem 102.

Despite the specific foregoing description, ordinarily skilled artisans (having the benefit of this disclosure) will recognize that the apparatus discussed above may be implemented in a machine of different construction, without departing from the scope of the invention. As a specific example, one of the components 206/208 may be eliminated, furthermore, the storage unit 204 may be provided on-board the processing unit 202, or even provided externally to the apparatus 200.

File Aggregation

Introduction

In an illustrative application of the invention, the storage subsystem 102 may be used to store "aggregate" files. Since this implementation greatly affects the use and contents of the database 113 and data storage 114, further description of file aggregation follows.

Each aggregate file comprises an aggregation of one or multiple constituent "user" files, received from a particular client station 106. The "user" files are created by the client stations 106, and managed by the subsystem 102 as a service to the client stations 106. The subsystem 102's use of aggregate files, however, is transparent to the client stations 106, which simply regard user files individually.

The aggregate files themselves are preferably stored on the data storage 114, with the database 113 being used to store information about the aggregate files. This information, or example, may include the addresses at which aggregate files are stored in the data storage 114, various characteristics of the stored data, certain client-specified data management preferences, and other information as discussed below.

Figure 5:
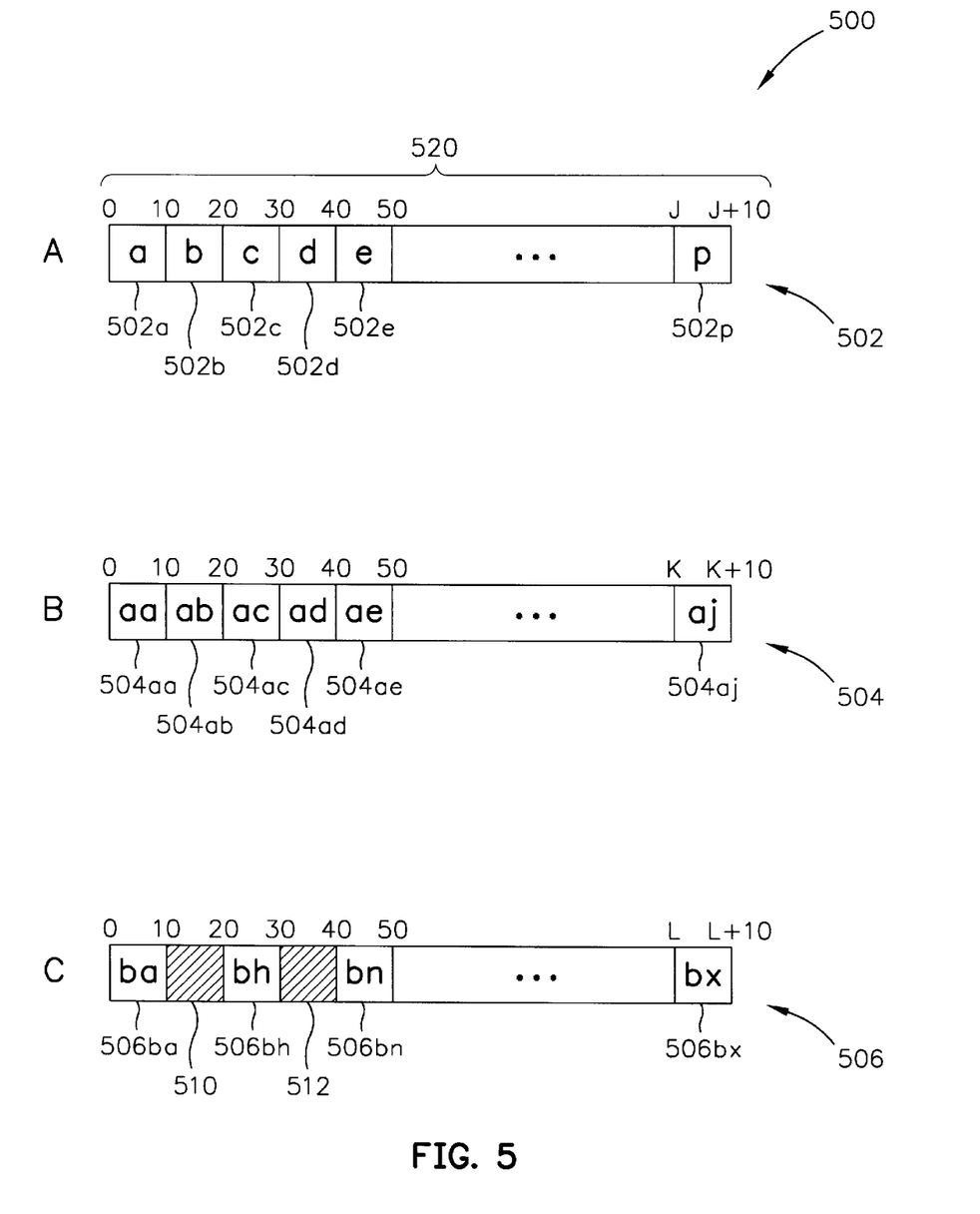
FIG. 5 is a block diagram showing the interrelationship of various illustrative user files and aggregate files.

FIG. 5 shows an exemplary set of three aggregate files 502–506. Aggregate files are also referenced by corresponding alphabetic designators A–C, for simpler representation in various tables shown below. For ease of explanation, upper case alphabetic designators refer to aggregate files, whereas lower case designators point out user files.

The aggregate file 502 includes multiple user files 502a–502p (also identified by alphabetic designators a–p). To conserve storage space, the user files 502a–502p are preferably originally stored adjacent to each other. The position of each user file in the aggregate file 502 is denoted by a corresponding one of the "offsets" 520. In an exemplary implementation, the offsets may represent bytes of data. Thus, the first user file 502a has an offset of zero bytes, and the second user file 502b has an offset of ten bytes. In the simplified example of FIG. 5, all user files are ten bytes long.

In contrast to the aggregate file 502, the aggregate file 504 includes a different group of constituent user files 504aa–504aj. The aggregate file 506 contains a still different group of user files 506ba–506bx. The aggregate file 506 also exemplifies "deleted-file" space, which may arise in aggregate files. Particularly, the file 506 includes regions of deleted-file space 510 and 512. These regions 510/512 may arise, for example, from client-requested deletion of user files formerly occupying these regions. The subsystem 102 treats each aggregate file as a contiguous whole despite any interstitial regions of deleted-file space, such as the regions 510/512.

The management of multiple aggregated user files together, including any interstitial regions of deleted-file space, helps to significantly reduce file management overhead costs. In particular, the subsystem 102 treats each aggregate file as a single file during many different operations, thus reducing file management overhead to that of a single file. These operations may include, for example, copy, move, migrate, storage pool backup, storage pool restore, etc. And, since aggregate files are treated as a contiguous whole despite any interstitial regions of deleted-file space, each aggregate file is copied, moved, backed up, restored, and migrated as a whole, with any interstitial regions of deleted-file space intact.

The creation and management of aggregate files is discussed in greater detail in the following patent applications, each of which is assigned to IBM and completely incorporated herein by reference:

1. U.S. patent application Ser. No. 08/960,423, entitled "STORAGE MANAGEMENT SYSTEM WITH FILE AGGREGATION", filed on Oct. 29, 1997 in the names of D. M. Cannon et al.
2. U.S. patent application Ser. No. 08/960,601, entitled "STORAGE MANAGEMENT SYSTEM WITH FILE AGGREGATION AND SPACE RECLAMATION WITHIN AGGREGATED FILES", filed on Oct. 29. 1997, in the names of D. M. Cannon et al.
3. U.S. patent application Ser. No. 08/960,427, entitled "STORAGE MANAGEMENT SYSTEM WITH FILE AGGREGATION SUPPORTING MULTIPLE AGGREGATED FILE COUNTERPARTS", filed on Oct. 29, 1997, in the name of D. M. Cannon.

Tables

As mentioned above, the database 113 contains various information about data contained in the data storage 114. Preferably, this information is arranged in the form of tables, although other data structures may be used.

In an exemplary implementation of the invention, these tables include: an inventory table, a storage table, a mapping table, and an aggregate file attributes table. Each table provides a different type of information, exemplified in the description below. Ordinarily skilled artisans (having the benefit of this disclosure) will quickly recognize that the tables shown below are merely examples, that this data may be integrated, consolidated, or otherwise reconfigured, and that their structure and contents may be significantly changed, all without departing from the scope of the present invention. For example, instead of tables, this data may be organized as one or more object-oriented databases.

Inventory Table

One table in the database 113 is the inventory table, an example of which is depicted in Table 1 (below). The inventory table contains information specific to each user file stored in the subsystem 102, regardless of the location and manner of storing the user files in the data storage 114. Generally, the inventory table cross-references each user file with various "client" information and various "policy" information. Each user file is listed by its filename, which may comprise any alphabetic, alphanumeric, numeric, or other code uniquely associated with that user file. The inventory table contains one row for each user file.

The client information includes information relative to the client station 106 with which the user file is associated. In the illustrated example, the client information is represented by "client number", "client type", and "source" columns. For each user file, the "client number" column identifies the originating client station 106. This identification may include a numeric, alphabetic, alphanumeric, or other code. In this example, a numeric code is shown. The "client type" column associates the client with one or more predetermined categories, such as different computer types, operating systems, communications parameters, etc. The "source" column lists a location in the client station 106 where the user file is stored locally by the client. As a specific example, a user file's source may comprise a directory in the client station.

In contrast to the client information of Table 1, the policy information includes information concerning the client's preferences for data management by the subsystem 102. Optimally this information includes the client's preferences themselves, as well as information needed to implement these preferences. In the illustrated example, the policy information is represented by "data retention time" as well as other (not shown) columns, listing a maximum number of backup versions to maintain, timestamps of backed-up data, etc.

TABLE 1

Inventory Table

| USER FILE-NAME | CLIENT CLIENT NUMBER | CLIENT TYPE | CLIENT SOURCE | ... | POLICY DATA RETENTION TIME | ... |
|---|---|---|---|---|---|---|
| a | 1 | Unix | /usr | | 30 days | |
| b | 1 | Unix | /usr | | 30 days | |
| c | 1 | Unix | /usr | | 30 days | |
| d | 1 | Unix | /usr | | 30 days | |
| e | 1 | Unix | /usr | | 30 days | |
| ... | 1 | Unix | /usr | | 30 days | |
| p | 1 | Unix | /usr | | 30 days | |
| aa | 27 | OS/2 | d:\data | | 90 days | |
| ab | 27 | OS/2 | d:\data | | 90 days | |
| ac | 27 | OS/2 | d:\data | | 90 days | |
| ad | 27 | OS/2 | d:\data | | 90 days | |
| ae | 27 | OS/2 | d:\data | | 90 days | |
| ... | 27 | OS/2 | d:\data | | 90 days | |
| aj | 27 | OS/2 | d:\data | | 90 days | |
| ba | 3 | Windows '95 | c:\data | | 365 days | |
| bh | 3 | Windows '95 | c:\data | | 365 days | |
| bn | 3 | Windows '95 | c:\data | | 365 days | |
| bx | 3 | Windows '95 | c:\data | | 365 days | |

Storage Table

Another table in the database 113 is the storage table, an example of which is depicted in Table 2 (below). In contrast to the inventory table (described above), the storage table contains information about where each aggregate file is stored in the data storage 114 The storage table contains a single row for each aggregate file.

In the illustrated example, the storage table includes "aggregate filename", "storage pool". "volume", "location". and other columns. The "aggregate filename" column lists the filenames of all aggregate files. Like the user files, each aggregate file has a filename that comprises a unique alphabetic, alphanumeric, numeric, or other code. For each aggregate file. the "storage pool" identifies a subset of the data storage 114 where the aggregate file resides. As mentioned above, each "storage pool" is a group of storage devices of the data storage 114 having similar performance characteristics. Identification of each storage pool may be made by numeric, alphabetic, alphanumeric, or another unique code. In the illustrated example, numeric codes are used.

The "volume" column identifies a sub-part of the identified storage pool. In the data storage arts, data is commonly grouped, stored, and managed in "volumes", where a volume may comprise a tape or a portion of a DASD. The "location" column identifies the corresponding aggregate file's location within the volume. As an example, this value may comprise a track/sector combination (for DASDs or optical disks), a tachometer reading (for magnetic or optical tape), etc.

TABLE 2

Storage Table

| AGGREGATE FILENAME | STORAGE POOL | VOLUME | LOCATION | ... |
|---|---|---|---|---|
| A | 1 | 39 | 1965 | |
| B | 1 | 39 | 1967 | |
| C | 1 | 2 | 16495 | |

Mapping Table

Another table in the database 113 is the mapping table, an example of which is depicted in Table 3 (below). Generally, this table operates to bidirectionally cross-reference between aggregate files and user files. The mapping table identifies, for each aggregate file, all constituent user files. Conversely, for each user file, the mapping table identifies one or more aggregate files containing that user file. In this respect, the specific implementation of Table 3 includes an "aggregate→user" column and a "user→aggregate" column.

The "aggregate→user" column contains multiple rows for each aggregate file, each row identifying one constituent user file of that aggregate file. Each row identifies an aggregate/user file pair by the aggregate filename ("aggregate filename" column) and the user filename ("user filename").

Conversely, each row of the "user→aggregate" column lists a single user file by its name ("user filename" column), cross-referencing this user file to the aggregate file containing the user file ("aggregate filename"). In each row, identifying one user/aggregate file pair, the row's user file is also cross-referenced to the user file's length ("length"column) and its offset within the aggregate file of that pair ("offset" column). In this example, the length and offset are given in bytes.

TABLE 3

Mapping Table

| (AGGREGATE --> USER) | | (USER --> AGGREGATE) | | | |
|---|---|---|---|---|---|
| AGGREGATE FILENAME | USER FILE-NAME | USER FILE-NAME | AGGREGATE FILENAME | LENGTH | OFFSET |
| A | a | a | A | 10 | 0 |
| | b | b | A | 10 | 10 |
| | c | c | A | 10 | 20 |
| | d | d | A | 10 | 30 |
| | e | e | A | 10 | 40 |
| | ... | ... | A | 10 | ... |
| | p | p | A | 10 | J |
| B | aa | aa | B | 10 | 0 |
| | ab | ab | B | 10 | 10 |
| | ac | ac | B | 10 | 20 |
| | ad | ad | B | 10 | 30 |
| | ae | ae | B | 10 | 40 |

TABLE 3-continued

Mapping Table

| (AGGREGATE --> USER) | | (USER --> AGGREGATE) | | | |
|---|---|---|---|---|---|
| AGGREGATE FILENAME | USER FILE-NAME | USER FILE-NAME | AGGREGATE FILENAME | LENGTH | OFFSET |
|  | ... | ... | B | 10 | ... |
|  | aj | aj | B | 10 | K |
| C | ba | ba | C | 10 | 0 |
|  | bh | bh | C | 10 | 20 |
|  | bn | bn | C | 10 | 40 |
|  | ... | ... | ... | 10 | ... |
|  | bx | bx | C | 10 | L |

Aggregate File Attributes Table

Another table in the database 113 is the aggregate file attributes table, an example of which is depicted in Table 4 (below). This table accounts for the fact that, after time, an aggregate file may contain some empty space due to deletion of one or more constituent user files. As explained below, the subsystem 102 generally does not consolidate an aggregate file upon deletion of one or more constituent user files. This benefits the efficient operation of the subsystem 102, by minimizing management of the aggregate files. Instead, to conserve storage space, the invention reconfigures data objects containing used space to facilitate their efficient compression, as discussed below.

Each row of the aggregate file attributes table represents a different aggregate file, identified by its aggregate filename ("aggregate filename" column). A row's aggregate file is cross-referenced to columns specifying the aggregate file's original size upon creation ("original size"), present size not including deleted-file space ("active size"), and number of non-deleted user files ("active files").

Other Tables

The database 113 may also be implemented to include a number of other tables, if desired, the content and structure being apparent to those of ordinary skill in the art (having the benefit of this disclosure). Some or all of these tables, for instance, may be added or incorporated into various existing tables discussed above. In a preferred embodiment, the database 113 includes a backup directory table (not shown) that indicates whether, for storage pool backup operations, each device or medium in the data storage 114 is designated as a primary device, designated as a backup device, or has no designation yet.

TABLE 4

Aggregate File Attributes Table

| AGGREGATE FILENAME | ORIGINAL SIZE | ACTIVE SIZE | ACTIVE FILES |
|---|---|---|---|
| A | J+10 | J+10 | 16 |
| B | K+10 | K+10 | 10 |
| C | L+10 | M | 13 |

Operation

In addition to the various hardware embodiments described above, a different aspect of the invention concerns a method of reconfiguring data objects containing unused space, to facilitate more efficient compression of the data objects. As a specific example, this technique may be applied to reconfigure aggregate files that, although created as a contiguous assembly of multiple constituent user files, now contain unused space arising from deleted constituent user files.

Signal-Bearing Media

More specifically, in the context of FIGS. 1–2 the method aspect of the invention may be implemented, for example, by operating the data processing apparatus 108 (embodied by the digital data processing apparatus 200), to execute a sequence of machine-readable instructions. These instructions may reside in various types of signal-bearing media. In this respect, one aspect of the present invention concerns a programmed product, comprising one or more signal-bearing media tangibly embodying a program of machine-readable instructions executable by a digital data processor to perform a method for reconfiguring data objects containing unused space, to facilitate more efficient compression of the data objects.

Figure 3:
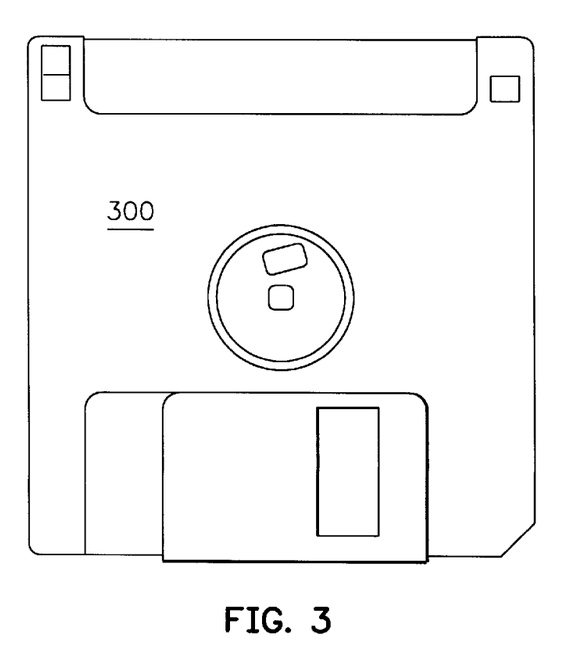
FIG. 3 shows an exemplary signal-bearing medium in accordance with the invention.

Illustratively, this signal-bearing media may comprise RAM (not shown) contained within the data processing apparatus 108, as represented by the fast-access storage 206 for example. Alternatively, the instructions may be contained in another signal-bearing media, such as a magnetic data storage diskette 300 (FIG. 3), directly or indirectly accessible by the processing unit 202. Whether contained in the digital data processing apparatus 200 or elsewhere, the instructions may be stored on a variety of machine-readable data storage media, such as DASD storage (e.g. a conventional "hard drive" or a RAID array), magnetic tape, electronic read-only memory (e.g., ROM, EPROM, or EEPROM), an optical storage device (e.g. CD-ROM, WORM, DVD), etc.), paper "punch" cards, or other suitable signal-bearing media including transmission media such as digital and analog and communication links and wireless. In an illustrative embodiment of the invention, the machine-readable instructions may comprise software object code, compiled from a language such as C, C++, PLX, etc.

Overall Sequence of Operation

Introduction

Figure 4:
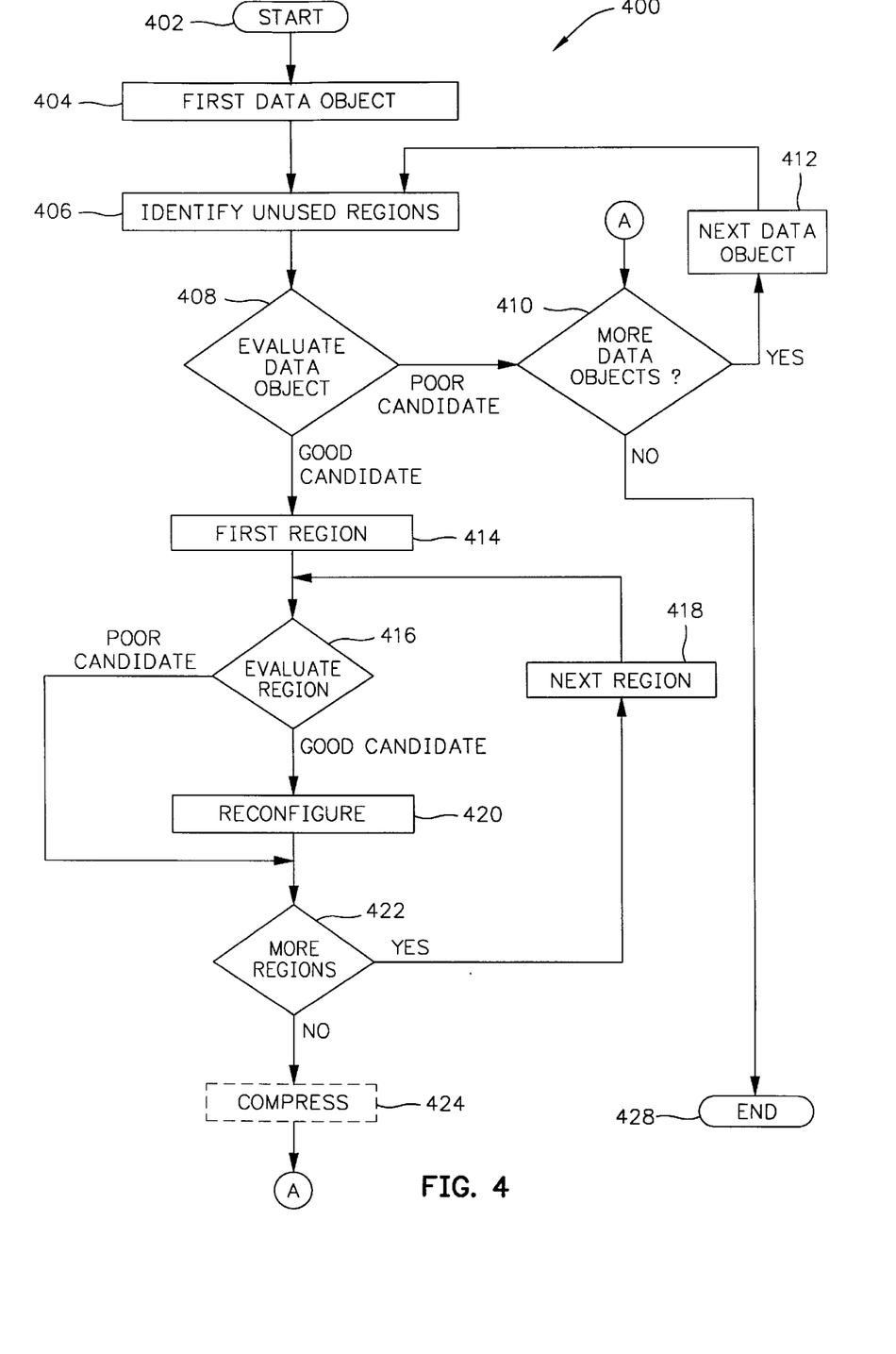
FIG. 4 is a flowchart illustrating a representative operational sequence for reconfiguring and compressing a data object containing regions of unused storage space in accordance with the invention.

As mentioned above, the method aspect of the invention concerns a method of reconfiguring data objects containing unused space, to facilitate more efficient compression of the data objects. FIG. 4 shows a sequence of method steps 400 to illustrate one example of the method aspect of the present invention. For ease of explanation, but without any limitation intended thereby, the example of FIG. 4 is described in the context of the environment of FIGS. 1–2, described above. In this context, the steps 400 may be performed by the data processing apparatus 108, for example.

The steps 400 are initiated in step 402 whenever a decision is made to evaluate one or more data objects as candidates for possible reconfiguration. As an example, this decision may be made by a human, such as a user, operator, system administrator, etc. Alternatively, this decision may be made by a machine, such as an automated computer program that initiates the routine 400 according to a predetermined event or schedule. As still another alternative, the routine 400 may be initiated automatically whenever selected storage operations are performed upon a data object, such as copying, migration, backup, etc.

As depicted in FIG. 4, the routine 400 sequentially examines multiple data objects. This illustration being used only to provide a comprehensive example, the routine 400 may be alternatively implemented with another mode of examinations e.g. examining just a single data object, examining multiple data objects concurrently, etc. Thus, the particular steps 400 and their order are shown to illustrate one particular example of the invention, many other embodiments being possible.

The data objects examined by the routine 400 may reside on one or multiple different storage media or devices. The data object being examined by the routine 400 is called the "current" data object. Step 404 begins with a first data object, making this the current data object.

A "data object" is any arrangement of digital data containing storage space that is deemed unused for any reason. As one example, a digital data object may comprise a physical assembly of data, such as a disk storage surface, data storage device, data storage medium (e.g. diskette, magnetic hard disk, ROM, EPROM, EEPROM, CD-ROM, writable CD, magnetic tape, paper punch cards, etc.). As another example, a data object may also comprise a logical assembly of data, such as a file, portion of a file, group of files, logical volume, or any other contiguous logical structure of digital data. One particular example of digital data object is an "aggregate file" as discussed in detail above, and in the U.S. Patent Applications cited above and incorporated by reference.

Identification of Unused Space

After step 404, step 406 identifies any regions of "used" storage space in the current data object. The "unused" space within the data object comprises storage space that does not contain active data. As an example, the unused storage space may represent data that is now abandoned for some reason. Abandoned data may, for example, be data that has been deleted, corrupted, expired according to some established timetable, marked for deletion, etc. Unused space may reside between files or even within a file. In the case of aggregate files, unused storage space includes "deleted-file" space, discussed in greater detail above.

Although not essential, the unused storage space is preferably deemed unused by a list or report. For example, the database 113 may contain a catalog, directory, or another data structure listing used ("in-use") storage space and/or unused storage space. In the particular example of a data object comprising an aggregate file, the existence of unused storage space is determined by consulting the aggregate file attributes table to determine whether the active space is less than the total space. In this embodiment, individual regions of unused storage space may be identified by consulting the mapping table, which contains length and offset information for each user file in an aggregate file.

Evaluation of Data Objects

After step 406, step 408 evaluates the current data object to determine whether it is a good candidate for reconfiguration of its unused storage regions. Step 408 may be performed in a number of different ways. As an example, step 408 may determine whether the unused storage space exceeds a certain threshold, thus warranting reconfiguration. This computation of data storage efficiency recognizes unused storage space as being the data object's total storage space minus any space occupied by active data, further reduced by any storable space that has been previously reconfigured.

Another alternative involves evaluating the data object's data storage efficiency. This may be achieved, for example, by comparing the ratio of in-use to total storage space against a predetermined threshold. In this embodiment, the data object is a good candidate for reconfiguration if it exhibits a sufficiently low data storage efficiency. As an example, the user may designate 40% data storage efficiency as being sufficiently low. In the context of an aggregate file, this ratio may be calculated by comparing the aggregate file's active size to its total size, as found in the aggregate file attributes table. As another alternative, data storage efficiency may be defined as a ratio of in-use storage space to the data object's total storage space reduced by the amount of reconfigured storage space in the data object. Implementation of this data storage efficiency computation requires tracking the amount of reconfigured storage space in each data object. This value may be monitored, for example, by maintaining a table or column of an existing table in the database 113, data storage 114, or elsewhere.

If the data object is a poor candidate for reconfiguration, Step 408 proceeds to step 410, which asks whether there are any more data objects to evaluate. If so, step 412 proceeds to the next data object, then returning to step 406. If step 410 finds no more data objects, the routine 400 ends in step 428.

Evaluation & Reconfiguration of Unused Regions

As discussed below, reconfiguration is actually performed region-by-region in the data object. Thus, if step 408 finds the current data object to be a good candidate for reconfiguration, the routine 400 evaluates each region of unused storage space for potential individual reconfiguration.

The region being examined by the routine 400 is called the "current" region. Step 414 begins with a first region, making this the current region of the current data object. Step 416 evaluates the current region to determine whether it is a good candidate for reconfiguration. Step 416 may be performed in a number of different ways. Preferably, step 416 determines whether the size of the unused region exceeds a certain threshold, which ensures that the region after reconfiguration (step 420, below) and compression (step 424, below) is smaller than the region before reconfiguration and compression. The reconfigured and compressed region may be referred to as a compression "token". In the foregoing example, then, step 416 determines whether the size of the unused region exceeds the size of this compression token. For example, a one-byte unused region would not warrant compression it the compression process represents data by a compression code having a minimum size of two bytes; the opposite would be true, however, if the unused region had a length of fifty-bytes.

The threshold may be additionally selected to ensure that the post-compression region is smaller by a certain margin or multiplicative factor than the pre-compression region.

If the unused region is a good candidate for reconfiguration, step 420 reconfigures the unused region. This is achieved by writing a predetermined bit pattern to the region, in replacement of its existing contents. In an exemplary embodiment, the predetermined bit pattern may be stored in a memory buffer (not shown) of the subsystem 102 to expedite repeated copying of the bit pattern to unused regions.

The bit pattern of step 420 is preferably selected to be easily recognized and efficiently compressed by the compression process (step 424). More particularly, the bit pattern is selected such that, if provided as input to a certain digital data compression process (step 424, below), it would be compressed with at least a particular predicted "compression efficiency". Compression efficiency may be measured for example, as a ratio of pre-compression to post-compression storage size, or another suitable computation. The compression efficiency is "predicted" based upon knowledge of how the implemented compression process treats the predetermined bit pattern; this may be near or even equal the "actual" compression efficiency achieved when compression is subsequently performed (step 424).

Preferably, the predetermined bit pattern is selected because of its high compressibility, thereby achieving the maximum compression efficiency when compressed. In this respect, certain bit patterns may be chosen because they have an obviously high compressibility by many compression processes, without requiring any specific knowledge of particular compression processes operation. As an example, desirable bit patterns include a sequence of repeating binary zeros, or a sequence of repeating binary ones. Both of these patterns are easily compressed by most known compression processes such as the well known Lempel-Ziv-Welch (LZW) and run length encoding (RLL) techniques. Preferably, the same bit pattern is used among all unused regions reconfigured by step 420, although different bit patterns may be used if desired.

If step 416 finds the current region to be a poor candidate for reconfiguration, step 420 is skipped. After steps 416 or 420, step 422 determines whether there are any more unused regions to evaluate. If so, step 418 proceeds to the next unused region, then returning to step 416. On the other hand, if step 422 finds no more unused regions in the current data object, the routine 400 proceeds to step 424.

Compression

After all appropriate unused regions of the current data object have been reconfigured by writing the predetermined bit pattern, step 424 is performed. Step 424 compresses the data object by applying the predetermined compression process. This process compresses the data object, including the unused regions now containing the predetermined bit pattern. These regions are compressed with an "actual" compression efficiency, which may be near or equal the predicted compression efficiency depending upon the accuracy of the previous prediction. As an example, the compression technique of step 424 may comprise a well known process such as the LZW or RLL methods. As one example, step 424 may be performed by writing the reconfigured data object to a data storage device, which automatically compresses data that it receives for storage. After the compression of step 424, control returns to step 410, which was discussed above.

Thus, as explained above, compression is performed for each data object, after all suitable unused regions in the current data object have been reconfigured. As an alternative, compression may be reserved until all data objects have been evaluated and reconfigured. In this case, compression is only performed after a negative answer to step 410, after which the routine 400 ends.

Other Embodiments

While there have been shown what are presently considered to be preferred embodiments of the invention, it will be apparent to those skilled in the art that various changes and scope of the invention as defined by the appended claims.

What is claimed is:

1. A method of reconfiguring an aggregate file originally created with a contiguous aggregation of user files, said aggregate file including deleted-file space arising from deletion of individual user files from the aggregate file, the method comprising:

determining that the aggregate file contains at least one region of deleted-file space;

in response to determining that the aggregate file contains deleted-file space, replacing the region of deleted-file space with a predetermined bit pattern having a desired compression efficiency when compressed by a predetermined digital data compression process.

2. The method of claim 1, the method further comprising:

providing the aggregate file, including the region containing the predetermined bit pattern, as input to the predetermined digital data compression process; and the predetermined digital data compression process compressing the data object, including compression of the region containing the predetermined bit pattern with an actual compression efficiency substantially identical to the desired compression efficiency.

3. The method of claim 1, the predetermined bit pattern comprising a sequence of binary zeros.

4. The method of claim 1, the predetermined bit pattern comprising a sequence of binary ones.

5. The method of claim 1, the desired compression efficiency representing a ratio of pre-compression size to post-compression size, the desired compression efficiency being a maximum possible compression efficiency.

6. The method of claim 1, the desired compression efficiency representing a ratio of pre-compression size to a time of compression, the desired compression efficiency being a maximum possible compression efficiency.

7. The method of claim 1, the replacing of the region of deleted-file space further comprising:

evaluating the region of deleted-file space and determining whether the region passes predetermined criteria, and replacing the region with the predetermined bit pattern only if the region passes the criteria.

8. The method of claim 7, the predetermined criteria comprising:

the region of deleted-file space being larger than a predetermined size.

9. The method of claim 1, the replacing of the region of deleted-file space further comprising:

evaluating the aggregate file and determining whether the aggregate file passes predetermined criteria, and replacing the region with the predetermined bit pattern only if the aggregate file passes the criteria.

10. The method of claim 9, the aggregate file passing the predetermined criteria if a ratio between storage space occupied by deleted-file space in the aggregate file and total storage space in the data object exceeds a predetermined threshold.

11. The method of claim 9, the aggregate file passing the determined criteria if a first ratio exceeds a predetermined threshold, the first ratio being a ratio between (1) deleted-file space in the aggregate file and (2) total storage space of the aggregate file reduced by the region previously replaced with predetermined bit patterns.

12. A method in accordance with claim 1, wherein the at least one region of unused storage space comprises a plurality of regions of unused storage space.

13. A signal-bearing medium tangibly embodying a program of machine-readable instructions executable by a digital processing apparatus to perform a method for reconfiguring an aggregate file originally created with a contiguous aggregation of user files, said aggregate file including deleted-file space arising from deletion of individual user files from the aggregate file, the method comprising:

determining that the aggregate file contains at least one region of deleted-file space;

in response to determining that the aggregate file contains deleted-file space, replacing the region of deleted-file space with a predetermined bit pattern having a desired compression efficiency when applied as input to a predetermined digital data compression process.

14. The signal-bearing medium of claim 13, the method further comprising:

providing the aggregate file, including the region containing the predetermined bit pattern, as input to the predetermined digital data compression process; and the predetermined digital data compression process compressing the data object, including compression of the region containing the predetermined bit pattern with an actual compression efficiency substantially identical to the desired compression efficiency.

15. The signal-bearing medium of claim 13, the predetermined bit pattern comprising a sequence of binary zeros.

16. The signal-bearing medium of claim 13, the predetermined bit pattern comprising a sequence of binary ones.

17. The signal-bearing medium of claim 13, the desired compression efficiency representing a ratio of pre-compression size to post-compression size, the desired compression efficiency being a maximum possible compression efficiency.

18. The signal-bearing medium of claim 13, the desired compression efficiency representing a ratio of pre-compression size to a time of compression, the desired compression efficiency being a maximum possible compression efficiency.

19. The signal-bearing medium of claim 13, the replacing of the region of deleted-file space further comprising:

evaluating the region of deleted-file space and determining whether the region passes predetermined criteria, and replacing the region with the predetermined bit pattern only if the region passes the criteria.

20. The signal-bearing medium of claim 19, the predetermined criteria comprising:

the region of deleted-file space being larger than a predetermined size.

21. The signal-bearing medium of claim 13, the replacing of the region of deleted-file space further comprising:

evaluating the aggregate file and determining whether the aggregate file passes predetermined criteria, and replacing the regions with the predetermined bit pattern only if the aggregate file passes the criteria.

22. The signal-bearing medium of claim 21, the aggregate file passing the predetermined criteria if a ratio between storage space occupied by deleted-file space in the aggregate file and total storage space in the data object exceeds a predetermined threshold.

23. The signal bearing medium of claim 21, the aggregate file passing the determined criteria if a first ratio exceeds a predetermined threshold, the first ratio being a ratio between (1) deleted-file space in the aggregate file and (2) total storage space of the aggregate file reduced by any regions previously replaced with predetermined bit patterns.

24. A signal-bearing medium in accordance with claim 13, wherein the at least one region of unused storage space comprises a plurality of regions of unused storage space.

25. A data storage subsystem, comprising:

a data storage containing an aggregate file originally created with a contiguous aggregation of user files, said aggregate file including deleted-file space arising from deletion of individual user files from the aggregate file; and a digital data processing apparatus, programmed to perform a method of reconfiguring the aggregate file, the method comprising:

determining that the aggregate file contains at least one region of deleted-file space;

in response to determining that the aggregate file contains at least one region of deleted-file space, replacing the region of deleted-file space with a predetermined bit pattern having a desired compression efficiency when applied as input to a predetermined digital data compression process.

26. The subsystem of claim 25, the method further comprising:

providing the aggregate file, including the region containing the predetermined bit pattern, as input to the predetermined digital data compression process; and the predetermined digital data compression process compressing the data object, including compression of the region containing the predetermined bit pattern with an actual compression efficiency substantially identical to the desired compression efficiency.

27. The subsystem of claim 25, the predetermined bit pattern comprising a sequence of binary zeros.

28. The subsystem of claim 25, the predetermined bit pattern comprising a sequence of binary ones.

29. The subsystem of claim 25, the desired compression efficiency representing a ratio of pre-compression size to post-compression size, the desired compression efficiency being a maximum possible compression efficiency.

30. The subsystem of claim 25, the desired compression efficiency representing a ratio of pre-compression size to a time of compression, the desired compression efficiency being a maximum possible compression efficiency.

31. The subsystem of claim 25, the replacing of regions of deleted-file space further comprising:

evaluating the region of deleted-file space and determining whether the region passes predetermined criteria, and replacing the region with the predetermined bit pattern only if the region passes the criteria.

32. The subsystem of claim 31, the predetermined criteria comprising:

the region of deleted-file space being larger than a predetermined size.

33. The subsystem of claim 25, the replacing of regions of deleted-file space further comprising:

evaluating the aggregate file and determining whether the aggregate file passes predetermined criteria, and replacing the region with the predetermined bit pattern only if the aggregate file passes the criteria.

34. The subsystem of claim 33, the aggregate file passing the predetermined criteria if a ratio between storage space occupied by deleted-file space in the aggregate file and total storage space in the data object exceeds a predetermined threshold.

35. The subsystem of claim 33, the aggregate file passing the determined criteria if a first ratio exceeds a predetermined threshold, the first ratio being a ratio between (1) deleted-file space in the aggregate file and (2) total storage space of the aggregate file reduced by any regions previously replaced with predetermined bit patterns.

36. A subsystem in accordance with claim 25, wherein the at least one region of unused storage space comprises a plurality of regions of unused storage space.

37. A data storage subsystem, comprising:

a data storage means for storing an aggregate file originally created with a contiguous aggregation of user files, said aggregate file including deleted-file space arising from deletion of individual user files from the aggregate file; and digital data processing means for reconfiguring the aggregate file by:

determining that the aggregate file contains regions of deleted-file space;

in response to determining that the aggregate file contains deleted-file space, replacing the regions of deleted-file space with a predetermined bit pattern having a desired compression efficiency when applied to the digital processing means.

* * * * *